US012770751B2

(12) United States Patent
Blamer

(10) Patent No.: US 12,770,751 B2
(45) Date of Patent: Oct. 20, 2026

(54) SYSTEM AND METHOD FOR MAKING NUCLEAR FUEL ELEMENTS WITH A CONTROLLED NUMBER OF NUCLEAR PARTICLES

(71) Applicant: X-Energy, LLC, Rockville, MD (US)

(72) Inventor: Brandon Blamer, Knoxville, TN (US)

(73) Assignee: X-ENERGY, LLC, Rockville, MD (US)

( * ) Notice: Subject to any disclaimer, the term of this patent is extended or adjusted under 35 U.S.C. 154(b) by 670 days.

(21) Appl. No.: 17/845,385

(22) Filed: Jun. 21, 2022

(65) Prior Publication Data

US 2023/0411024 A1 Dec. 21, 2023

(51) Int. Cl.
*G21C 21/00* (2006.01)
*G21C 3/04* (2006.01)
(Continued)

(52) U.S. Cl.
CPC ............. *G21C 21/00* (2013.01); *G21C 3/045* (2019.01); *G01N 15/0272* (2013.01); (Continued)

(58) Field of Classification Search
CPC .................... G21C 21/00; G21C 3/045; G01N 2015/1486; G01N 15/0272; G01N 15/1459; G01N 2021/845; G01N 15/14
(Continued)

(56) References Cited

U.S. PATENT DOCUMENTS 3,318,695 A 5/1967 Polenz
3,773,867 A * 11/1973 Williams ................. G21C 3/64 376/411
(Continued)

FOREIGN PATENT DOCUMENTS

CN 105185424 B 12/2017
CN 109994223 A 7/2019
(Continued)

OTHER PUBLICATIONS

Xiao, "Design of Intelligent Counting Equipment System for Uniform Materials", In Journal of Physics: Conference Series, vol. 1748, No. 4, p. 042037, IOP Publishing, 2021. (Year: 2021).*
(Continued)

*Primary Examiner* — Jack W Keith
*Assistant Examiner* — Daniel Wasil
(74) *Attorney, Agent, or Firm* — Kramer & Amado, P.C.

(57) ABSTRACT

An optical counter is used in a method and system for producing a nuclear fuel element having a known volume of homogeneously distributed nuclear material. The method includes feeding nuclear fuel kernels along a channel having a conveyer configured to transmit the kernels to an exit; driving the conveyer until a target number of kernels exits the channel through the exit; and counting a number of kernels which pass through the exit of the channel with an optical counter. The conveyer is stopped after the target number of nuclear fuel kernels exits the channel. The target number of nuclear fuel kernels are fed into a mold, and void space remaining in the mold is filled with a particulate matrix material so as to homogeneously distribute the target number of nuclear fuel kernels within the matrix material. The matrix material is then converted into a solid matrix material.

11 Claims, 7 Drawing Sheets

(51) Int. Cl.
*G01N 15/02* (2006.01)
*G01N 15/14* (2006.01)
*G01N 21/84* (2006.01)

(52) U.S. Cl.
CPC . *G01N 15/1459* (2013.01); *G01N 2015/1486* (2013.01); *G01N 2021/845* (2013.01)

(58) Field of Classification Search
USPC .................................................. 376/261, 419
See application file for complete search history.

(56) References Cited

U.S. PATENT DOCUMENTS

| | | | | |
|---|---|---|---|---|
| 3,997,063 | A | 12/1976 | Adams et al. | |
| 4,092,384 | A | 5/1978 | Hrovat | |
| 4,468,163 | A * | 8/1984 | King | G21C 21/00 976/DIG. 282 |
| 4,963,317 | A | 10/1990 | Wiencek | |
| 4,994,666 | A * | 2/1991 | Higgison | G06M 9/00 250/222.2 |
| 5,383,228 | A | 1/1995 | Armijo | |
| 6,639,961 | B2 * | 10/2003 | Bailey | G21C 21/02 376/268 |
| 8,085,894 | B2 | 12/2011 | Arsenlis | |
| 8,243,871 | B2 | 8/2012 | Hrovat | |
| 8,754,282 | B2 | 6/2014 | Persaud | |
| 8,972,049 | B2 | 3/2015 | Tidhar et al. | |
| 9,174,364 | B2 * | 11/2015 | Puliga | B29C 48/03 |
| 9,202,165 | B2 | 12/2015 | Heinz | |
| 9,786,391 | B2 | 10/2017 | Pappano et al. | |
| 9,793,010 | B2 | 10/2017 | Van Staden | |
| 10,062,458 | B2 | 8/2018 | Xu | |
| 10,109,378 | B2 | 10/2018 | Snead | |
| 2003/0103593 | A1 | 6/2003 | Bailey | |
| 2006/0054872 | A1 * | 3/2006 | Kuczynski | G21C 21/04 252/636 |
| 2011/0282488 | A1 * | 11/2011 | Horev | G06M 7/00 700/232 |
| 2012/0314831 | A1 | 12/2012 | Terrani et al. | |
| 2014/0249669 | A1 | 9/2014 | Puliga | |
| 2017/0287577 | A1 | 10/2017 | Venneri | |
| 2018/0233239 | A1 | 8/2018 | Kim et al. | |
| 2019/0043625 | A1 | 2/2019 | Hackett et al. | |
| 2019/0237206 | A1 | 8/2019 | Lahoda et al. | |
| 2020/0321134 | A1 | 10/2020 | O'Brien | |
| 2021/0057115 | A1 | 2/2021 | Subhash et al. | |

FOREIGN PATENT DOCUMENTS

| | | | | |
|---|---|---|---|---|
| CN | 107123455 | B | 8/2019 | |
| CN | 111695246 | A | 9/2020 | |
| CN | 110277177 | B | 11/2020 | |
| EP | 0454911 | A1 | 11/1991 | |
| GB | 1060833 | A | 3/1967 | |
| KR | 820001575 | B1 * | 9/1982 | G21C 21/00 |
| KR | 101622569 | B1 | 5/2016 | |

OTHER PUBLICATIONS

Ahmed, "Innovative Low-Cost Approaches to Automating QA/QC of Fuel Particle Production Using On-Line Nondestructive Methods for Higher Reliability", Nuclear Energy Research Initiative Project No. 02-103 (2006). (Year: 2006).*

McLemore, "Automated in-line measurement of nuclear fuel pellets", Trans. Am. Nucl. Soc., Suppl (United States) 33, No. 1 (1979). (Year: 1979).*

Karnowski, "A simple optical system for real-time size measurements of Triso fuel pellets", In Machine Vision Applications in Industrial Inspection XIII, vol. 5679, pp. 62-73. SPIE, 2005. (Year: 2005).*

Kumar, (2014) "Advances and issues related to automated inspection PHWR fuel pellets at Nuclear Fuel Complex, Hyderabad", Asia Pacific Conference on Non-Destructive Testing (14th APCNDT), Mumbai, India, Nov. 18-22, 2013. e-Journal of Nondestructive Testing vol. 19(2). https://www.ndt.net/?id=15130 (Year: 2014).*

Jones, "Light scattering for particle characterization", Progress in Energy and Combustion Science 25, No. 1 (1999): 1-53. (Year: 1999).*

Kim, "Fabrication of Metallic Particulate Fuel by Frequency-variable Electrodynamic Vibration", power 6 (2020): 76-9. (Year: 2020).*

Michael J. Kania et al., "Testing of HTR UO2 Triso fuels in AVR and in material test reactors"; Journal of Nuclear Materials; Jul. 13, 2013; pp. 545-562; vol. 441.

Hyun-Min Kim et al.; "Pressureless Sintering of Fully Ceramic Microencapsulated Fuels"; Journal of the European Ceramic Society; Jul. 17, 2020; pp. 5180-5185; vol. 40.

S.C. Lee et al.; "A densification model for powder materials under cold isostatic pressing—Effect of adhesion and friction of rubber molds" Materials Science and Engineering A; Aug. 11, 2008; pp. 359-368; vol. 498.

"Triso-Coated Fuel Particle Performance"; pp. 1-98.

Sunghwan Yeo et. al.; "Reduced anisotropic properties of Cold Isostatic Pressed graphite matrix compacts"; Journal of Nuclear Materials; Dec. 29, 2018; pp. 245-256; vol. 515.

Massimiliano Fratoni et al; "PWR core design with Metal Matrix Micro-encapsulated (M3) fuel"; Progress in Nuclear Energy; Jul. 16, 2017; pp. 419-426; vol. 100.

Jacob W. Mcmurray et al; "Production of near-full density uranium nitride microspheres with a hot isostatic press"; Journal of American Ceramic Society; May 7, 2018; pp. 4492-4497.

T Kwamman; "Study of carbide composites processed by spark plasma sintering for Gen IV reactors"; J. Phys.:Conf. Ser. 1380; 2019.

Fangcheng Cao et al.; "Microstructure and Thermal Conductivity of Fully Ceramic Microencapsulated Fuel".

Yang Zhong et al.; "Spark Plasma Sintering of Fuel Cermets for Nuclear Reactor Applications"; Nov. 2011; pp. 1-6.

* cited by examiner

SYSTEM AND METHOD FOR MAKING NUCLEAR FUEL ELEMENTS WITH A CONTROLLED NUMBER OF NUCLEAR PARTICLES

TECHNICAL FIELD

Various exemplary embodiments disclosed herein relate generally to preparation of nuclear fuel elements particles of a nuclear material evenly distributed in a matrix.

BACKGROUND

Generally, nuclear fuel elements consist of particles of a nuclear material distributed in a matrix. The nuclear fuel particles may be uranium, plutonium, or thorium compounds. In various embodiments, the nuclear fuel particles kernels may contain ceramic kernels of nuclear metals. In the case of uranium, such ceramic kernels may include uranium oxide ($UO_2$), uranium oxycarbide (UCO), uranium carbide ($UC_2$ or UC), or uranium nitride (UN). The nuclear fuel particles may contain bare kernels, or kernels which are coated with protective carbon or ceramic layers. In various embodiments, the nuclear fuel particles may contain kernels of a uranium ceramic compound, coated with protective ceramic or carbon layers.

The nuclear fuel elements may be tri-structural isotropic (TRISO) fuel particles. Such TRISO particles include multiple layers of various thicknesses and of different chemistries (carbon, SiC or ZrC). To produce TRISO particles, ceramic nuclear fuel kernels are sequentially coated with:

- A porous carbon layer;
- An inner pyrolytic carbon layer;
- A ceramic layer, e.g., a silicon carbide, tungsten carbide, zirconium carbide, or zirconium nitride layer; and
- An outer pyrolytic carbon layer.

Nuclear fuel elements consist of coated or uncoated particles of a nuclear fuel kernel evenly distributed in a matrix. The matrix that surrounds the fuel may be graphite, a ceramic, such as SiC or ZrC, or a resin, such as a phenolic resin. Fuel elements may be shaped as spheres, cuboids, or cylinders. The fuel elements may be:

- Generally homogenous with evenly distributed nuclear fuel particles;
- Non-homogeneous, with an inner core containing fuel particles dispersed in a matrix material, and an outer layer of matrix material free of nuclear fuel;
- Non-homogeneous, with an inner core and an outer layer of matrix material free of nuclear fuel, and a fuel-containing layer therebetween; and
- Non-homogeneous, with multiple layers, each layer including a different type or size of fuel particles.

The fuel elements may include burnable poisons in the matrix material, or as distinct particles embedded within the matrix material. Such burnable poisons prevent criticality from excess nuclear fuel early in the life of the fuel element, while being consumed by neutron absorption as the nuclear fuel is consumed.

Nuclear fuel elements containing TRISO particles may be used to generate a nuclear chain reaction, where one single nuclear reaction causes an average of one or more subsequent nuclear reactions. A neutron multiplication factor, k, represents the average number of neutrons from one fission reaction that cause another fission, and is defined as:

$$k = \frac{\text{number of neutrons in one generation}}{\boxed{\text{number of neutrons in preceding generation}}}$$

In general, the value of k determines how the nuclear reaction proceeds. Specifically,

- If k is greater than 1, the chain reaction is supercritical, and the neutron population will grow exponentially.
- if k is less than 1, the chain reaction is subcritical, and the neutron population will exponentially decay.
- If k=1, the chain reaction is critical and the neutron population will remain constant.

Since the total amount of fissionable material that is present within the matrix material of a nuclear fuel element affects the value of the multiplication factor k, a system for producing a fuel element with a predictable mass loading is desirable. The fuel kernels should be homogeneously distributed in radioactive fuel elements for uniformity.

SUMMARY

In light of the present need for improved methods of providing nuclear fuel elements with controlled distribution of nuclear kernels, a brief summary of various embodiments is presented. Some simplifications and omissions may be made in the following summary, which is intended to highlight and introduce some aspects of the various embodiments, but not to limit the scope of the invention.

Various embodiments disclosed herein relate to a method for producing a nuclear fuel element having a known volume of homogeneously distributed nuclear material, including steps of:

- feeding nuclear fuel particles along a channel having an exit, the channel having a conveyer configured to transmit the nuclear fuel particles to the exit;
- driving the conveyer until a target number of nuclear fuel particles exits the channel through the exit; and
- counting a number of nuclear fuel particles which pass through the exit of the channel with an optical counter,
- stopping the conveyer after the target number of nuclear fuel particles exits the channel;
- feeding the target number of nuclear fuel particles into a mold for shaping the nuclear fuel element;
- filling the mold containing the target number of nuclear fuel particles with a particulate matrix material so as to homogeneously distribute the target number of nuclear fuel particles within the particulate matrix material; and
- converting the particulate matrix material into the solid matrix material, wherein a volume of nuclear material in the target number of nuclear fuel particles is known.

According to various embodiments disclosed herein, the mold is filled with a volume of particulate matrix material sufficient to fill any void space remaining after feeding the target number of nuclear fuel particles into the mold, so that a ratio of the volume of nuclear material in the nuclear fuel particles to the volume of solid matrix material in the fuel element is known.

In various embodiments, driving the conveyer may involve driving a vibratory conveyer having a conveyer surface running along the length of the channel to the exit; and a motor configured to vibrate the conveyer surface.

In various embodiments, the channel may have a tubular or semicylindrical conveyer surface running along the length of the channel to the exit, with a threaded auger therein. Driving the conveyer may involve rotating the threaded auger to drive particles within a helical thread of the auger along the conveyer surface to the exit. A motor is configured to rotate the threaded auger.

In various embodiments, the channel may have a sloped metal conveyer surface running along the length of the channel to the exit. The conveyer may be driven by gravity feed, a motor configured to vibrate the conveyer surface, or a combination thereof. If the conveyer is driven by gravity feed, stopping the conveyer may involve closing a gate at the channel exit. If the conveyer is driven by vibration, stopping the conveyer may involve stopping the motor.

In various embodiments, driving the conveyer may involve driving a conveyer having at least two rollers and an endless belt carried by the at least two rollers, the endless belt running along the length of the channel to the exit; and a motor configured to rotate the at least two rollers.

In the disclosed method, the optical counter may include:

- a laser positioned at the exit from the channel, wherein the laser is configured to transmit a beam, wherein the beam is interrupted each time one of the nuclear fuel particles exits the channel;
- a sensor configured to receive the beam from the laser, wherein the sensor is configured to transmit a first signal each time the beam is interrupted; and
- a control circuit, wherein the control circuit is configured to:
  - receive the first signal from the sensor each time the beam is interrupted, and calculate a number of nuclear fuel particles which exit the channel; and
  - transmit a second signal to a motor driving the conveyer when the target number of nuclear fuel particles exits the channel.

The step of stopping the conveyer includes stopping the motor driving the conveyer after the motor receives the second signal.

In the disclosed method, the optical counter may include:

- a camera positioned at the exit from the conveyer, wherein the camera is configured to transmit a first signal each time one of the nuclear fuel particles exits the channel; and
- a control circuit, wherein the control circuit is configured to:
- receive the first signal from the camera each time one of the nuclear fuel particles exits the channel, and calculate a number of nuclear fuel particles which exit the channel; and
  - transmit a second signal to a motor driving the conveyer when the target number of nuclear fuel particles exits the channel.

The step of stopping the conveyer includes stopping the motor driving the conveyer after the motor receives the second signal.

In the disclosed method, the optical counter may include:

- a high-powered LED positioned at the exit from the channel, wherein the LED is configured to shine light through a path taken by particles exiting the channel;
- a digital camera configured to receive the light from the LED and record a sequence of images; and
- a control circuit, wherein the control circuit is configured to:
  - analyze each image in the sequence of images for dark spots, where each dark spot corresponds to a particle;
  - record a total number of particles in the sequence of images until a target number of particles is reached; and
  - transmit a signal to a motor driving the conveyer when the target number of particles is reached.

The step of stopping the conveyer includes stopping the motor driving the conveyer after the motor receives the signal.

In various embodiments disclosed herein, the step of converting the particulate matrix material into the solid matrix material may be performed by subjecting the nuclear fuel particles and the particulate matrix material within the mold to hot isostatic pressing, cold isostatic pressing, spark plasma sintering, or uniaxial pressing. The particulate matrix material within the mold may be graphite, phenolic resin, or a metal carbide, e.g., SiC or ZrC. The particulate matrix material within the mold may also include a polymeric binder and/or a burnable poison. Suitable burnable poisons include gadolinium, boron, hafnium, and/or compounds thereof.

Various embodiments disclosed herein relate to a system for producing a nuclear fuel element having a known amount of homogeneously distributed nuclear material, including:

- a channel having an exit, the channel being configured to receive nuclear fuel particles;
- a conveyer configured to transmit the nuclear fuel particles along the channel to the exit;
- an optical counter configured to count a number of nuclear fuel particles which pass through the exit of the channel, and transmit a first signal when a target number of nuclear fuel particles exits the channel, and
- a motor configured to drive the conveyer until the target number of nuclear fuel particles exits the channel through the exit, and stop the conveyer after receiving the first signal from the optical counter. The system may further include a mold, or intermediate container prior to a mold, configured to receive the target number of nuclear fuel particles and a particulate matrix material; and homogeneously distribute the target number of nuclear fuel particles within the particulate matrix material. The mold may be a graphite mold, a metal mold, or a polymeric or elastomeric mold. In various embodiments, homogeneous distribution of the target number of nuclear fuel particles is achieved by vibrating the mold while filling the mold with nuclear fuel particles and particulate matrix material.

In various embodiments of the system, the conveyer is a vibratory conveyer having a conveyer surface running along the length of the channel to the exit; and a motor configured to vibrate the conveyer surface. In some embodiments of the system, the conveyer has at least two rollers and an endless belt carried by the at least two rollers, the endless belt running along the length of the channel to the exit; and a motor configured to rotate the at least two rollers. In some embodiments of the system, the conveyer may include a threaded auger or a sloped metal conveyer.

The optical counter in the disclosed system may include:

- a laser positioned at the exit from the conveyer, wherein the laser is configured to transmit a beam, wherein the beam is interrupted each time one of the nuclear fuel particles exits the channel;
- a sensor configured to receive the beam from the laser, wherein the sensor is configured to transmit a second signal each time the beam is interrupted; and
- a control circuit, wherein the control circuit is configured to:
  - receive the second signal from the sensor each time the beam is interrupted, and calculate a number of nuclear fuel particles which exit the channel; and
  - transmit the first signal to the motor when the target number of nuclear fuel particles exits the channel.

The optical counter in the disclosed system may include:

a camera positioned at the exit from the conveyer, wherein the camera is configured to transmit a second signal each time one of the nuclear fuel particles exits the channel; and a control circuit, wherein the control circuit is configured to:

receive the second signal from the camera each time one of the nuclear fuel particles exits the channel; and transmit the first signal to the motor when the target number of nuclear fuel particles exits the channel.

Various embodiments disclosed herein relate to a method for producing a nuclear fuel element having a predictable multiplication factor k. The method involves feeding nuclear fuel particles having a known particle size along a channel having a conveyer configured to transmit the nuclear fuel particles to an exit. The conveyer is driven until a target number of nuclear fuel particles exits the channel through the exit. An optical counter is used to count the number of nuclear fuel particles which pass through the exit of the channel. The conveyer is stopped after the target number of nuclear fuel particles exits the channel, and a mold is filled with the target number of nuclear fuel particles and a particulate matrix material. During the filling step, the mold is vibrated so as to homogeneously distribute the nuclear fuel particles within the particulate matrix material. The particulate matrix material is converted into a solid matrix material. Since the nuclear kernels are evenly distributed within the matrix material, and have a similar particle size, the resulting fuel element has a minimized value of multiplication factor k.

BRIEF DESCRIPTION OF THE DRAWINGS

In order to better understand various exemplary embodiments, reference is made to the accompanying drawings, wherein.

DETAILED DESCRIPTION

Figure 1:
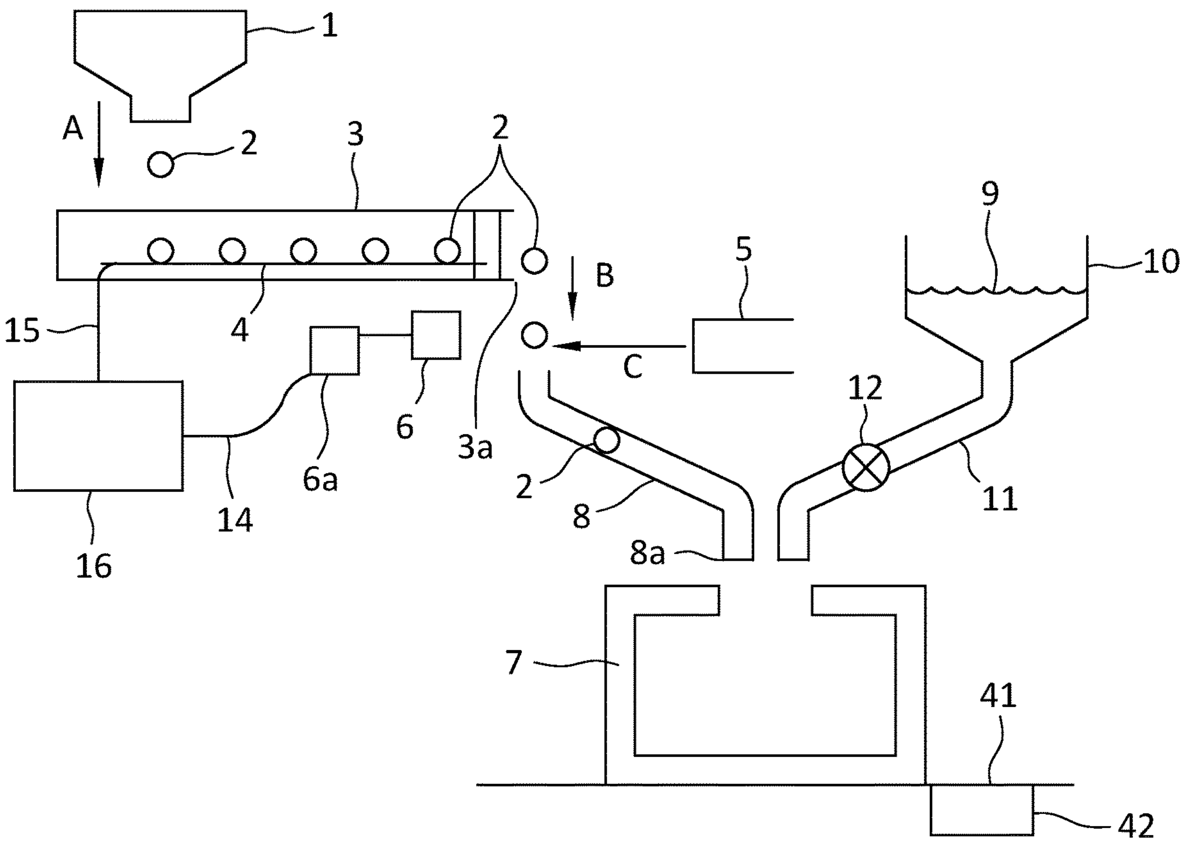
FIG. 1 illustrates a system for filling a mold for a nuclear fuel element, including a conveyer for receiving nuclear fuel particles and an optical counter for counting nuclear fuel particles.

Referring now to the drawings, in which like numerals refer to like components or steps, there are disclosed broad aspects of various exemplary embodiments.

As used herein, the term "about" encompasses the stated value "plus or minus 10%." "Substantially," as applied to a value, may allow a variance of up to 15%.

As used herein, the term "homogeneous distribution," as it relates to particles in a matrix, means that the particles are evenly distributed through the matrix material, so that any two sections of equal volume through the matrix material have a substantially similar number of particles.

When discussing nuclear fuel particles, the term "kernel" relates to a radioactive ceramic particle. The term "particle" may relate to a kernel, or to a particle produced by coating a kernel with a carbon layer, a ceramic layer, or a combination thereof. The term "TRISO particle" relates to a particular class of coated kernels, which are sequentially coated with a porous carbon layer; an inner pyrolytic carbon layer; a ceramic layer, e.g., a metal carbide, oxide, or nitride layer; and an outer pyrolytic carbon layer.

In various embodiments, the present disclosure describes systems and methods for producing multiple nuclear fuel elements with an accurately determined amount of uranium in each fuel element. Each fuel element contains substantially the same number of nuclear fuel kernels as any other fuel element. Each nuclear fuel kernel has about the same volume and about the same mass as any other nuclear fuel kernel. Each nuclear fuel kernel has a mass within ±10% of a target mass M. The number of nuclear fuel kernel included in each fuel element is counted with an optical counter. Counting nuclear fuel kernels, where each kernel has a mass M±10%, until a target number of kernels N is reached, and then preparing fuel elements containing N kernels, results in fuel elements containing a predictable amount of nuclear material. The fuel elements are manufactured so that the kernels are homogeneously distributed within each fuel element. Each fuel element contains the same number of substantially identical kernels homogeneously distributed within a matrix. While the kernels may contain ceramic and/or carbon coatings, the mass of each kernel is substantially identical.

Conventional processes, in contrast, use nuclear fuel particles having a defined total mass, rather than a defined number of particles or a defined particle volume. In such a system, the number of particles cannot be readily predicted, as the particles may contain a mixture of small and large particles. Further, particles are frequently coated kernels, where the kernels are coated with a carbon layer, a ceramic layer, or a combination of carbon and ceramic layers. The mass of each particle contains a contribution from the kernel and from the coating layers, each with its own uncertainty. As a result, the error in determining the amount of nuclear material from measuring mass is higher than the error from counting a predetermined number of particles.

As discussed above, measuring an amount of nuclear material based only on mass may produce a fuel element with kernels having variable sizes. If the kernels have different surface area, i.e., if small kernels and large kernels are mixed, the total kernel surface area is reduced. Under these conditions, k-infinity is increased. The present disclosure describes a system for counting nuclear fuel kernels with substantially identical size and mass to produce fuel elements with a uniform kernel size and a reduced k-infinity. Various counting processes disclosed herein may be carried out very quickly, so measuring an amount of nuclear material based on particle count rather than particle mass improves accuracy without significantly sacrificing productivity.

FIG. 1 shows a system for filling a mold 7 with nuclear fuel pellets or particles 2 and a particulate matrix material 9. A first hopper 1 contains nuclear fuel pellets 2, e.g., uranium oxide particles, uranium carbide particles, uranium oxycarbide particles, or TRISO particles. Nuclear fuel pellets 2 are fed in the direction of arrow A into a channel 3 containing a vibratory conveyer 4. A motor 16 connected to conveyer 4 by actuator 15 causes conveyer 4 to vibrate, causing particles 2 to move along conveyer 4 toward an output opening 3*a* in channel 3. As particles 2 leave channel 3 through opening 3*a*, they enter a passage 8 with an output 8*a* conveying the particles 2 into mold 7 through an opening. Meanwhile, a second hopper 10 containing particulate matrix material 9 feeds the particulate matrix material 9 into a second passage 11, conveying the particulate matrix material 9 into mold 7 through an opening. Once mold 7 has been filled with the particulate matrix material 9 and particles 2, a mass flow controller, e.g., a valve 12, may be used to cease flow of matrix material 9 to mold 7. Mold 7 is used to prepare a nuclear fuel element.

In various embodiments, nuclear fuel pellets or particles 2 have a defined mean particle size and/or a defined particle size range. Based on such information regarding the size of particles 2, knowledge of the number of nuclear fuel pellets or particles 2 allows a good estimate of the amount of nuclear material present in the nuclear fuel element prepared in mold 7. Additionally, use of a known number of nuclear fuel pellets or particles 2 having a controlled mean particle size or particle size range provides a nuclear fuel element containing nuclear fuel pellets 2 with a controlled surface area. If all particles have a similar surface area, the total kernel surface area is maximized. Under these conditions, k-infinity, or a ratio of neutrons resulting from fission in a current generation to neutrons absorbed in a preceding generation in a system of infinite size, is a minimum.

To solve this, the system of FIG. 1 uses an optical sensor to count the number of particles going into mold 7. As particles 2 pass from channel mouth 3*a* to passage 2 in the direction of arrow B, they pass the optical sensor. The optical sensor comprises a light source 5 and a sensor 6. In various embodiments, light source 5 is a laser which sends a beam in the direction of arrow C to a sensor 5 which records an intensity of the beam from light source 5. Sensor 6 is configured to communicate with a control circuit 6*a*.

The term "control circuit," as used herein, represents any type of information processing unit. The control circuit may be a central processing unit (CPU), external to the optical sensor, where which may communicate with the optical sensor through a wired or wireless communication network. The control circuit may be a microprocessor included within the optical sensor, specifically within sensor 6. The control circuit may be a logic circuit or logic gate included on an integrated circuit within sensor 6. The control circuit may be a combination of a logic gate included on an integrated circuit within sensor 6 and a CPU or microprocessor.

Each time a particle 2 passes through the beam from laser 5, the beam intensity is reduced and sensor 6 sends a signal to the control circuit 6*a*. Control circuit 6*a* records the number of signals received from sensor 6 as a count of the number of particles passing sensor 6. Once a target number of particles passes by sensor 6, the control circuit 6*a* sends a signal to motor 16 through line 14, switching off the motor 16 and stopping the vibratory conveyer 4. This allows a precise number of nuclear fuel pellets or particles 2 to enter mold 7. The control circuit may be implemented using a logic gate implemented in an integrated circuit, or by using a CPU or microprocessor.

The control circuit 6*a* may be a sequential logic circuit implemented on an integrated circuit, which counts particles leaving channel 3 until the target number is reached, and then sends a signal shutting down motor 16. The logic circuit may be designed to reset the particle number to 0 upon sending the signal to motor 16.

The control circuit 6*a* may include a logic circuit implemented on an integrated circuit, and a CPU or microprocessor. The logic circuit sends a signal to the CPU or microprocessor each time a particle leaves channel 3, and the CPU or microprocessor counts the number of particles until the target number is reached, and then sends a signal shutting down motor 16. In various embodiments, the logic circuit may be a NOT gate which sends a signal each time a particle 2 passes through the beam from laser 5. In various embodiments, the logic circuit may be a two-input logic gate. For example, sensor 6 may be configured to detect both a reduction in laser intensity as a particle 2 passes through a beam from laser 5, and a time T until the laser reaches its original strength. This may be used to screen out phantom signals from momentary fluctuations in laser intensity. The two-input logic gate may, for example, be an AND gate, configured to sends a signal each time a particle 2 passes through the beam from laser 5, as determined when:

the laser intensity dips below a baseline intensity, and the laser intensity takes more than minimum time T to return to its initial intensity.

The two-input logic gate may be an OR gate, configured to sends a signal each time a particle 2 passes through the beam from laser 5, as determined when either:

the laser intensity is reduced by a target value, or the laser intensity is reduced for greater than a target period of time.

A one- or two-input logic gate may be assembled from a network of connected NAND gates.

The control circuit 6*a* may include a CPU or microprocessor configured to record an output from sensor 6, count particles leaving channel 3 based on this output, and then send a signal shutting down motor 16 once the target number is reached.

In various embodiments, the optical sensor comprises a light source 5 and a sensor 6, where sensor 6 is a camera positioned at the exit from the conveyer. The camera is configured to transmit a first signal each time one of the nuclear fuel particles exits the channel. The optical sensor also includes a control circuit, configured to receive the first signal from the camera each time one of the nuclear fuel particles exits the channel, and calculate a number of nuclear fuel particles which exit the channel. The control circuit transmits a second signal to a motor driving the conveyer when the target number of nuclear fuel particles exits the channel, wherein the second signal stops the motor.

In various embodiments, the optical sensor comprises an LED as light source 5, and a camera as sensor 6. The camera is positioned at the exit from the conveyer, and is configured to record a sequence of images of a stream of particles exiting the conveyer. The camera is configured to sequentially transmit each image in the sequence of images to a control circuit. The control circuit is configured to sequentially analyze each image for dark spots, i.e., spots where brightness of the image falls below a threshold value. Each dark spot corresponds to a particle. The control circuit counts a number of particles in each image, and calculates a total number of nuclear fuel particles which exit the channel in the sequence of images. Once the total number of nuclear fuel particles exiting the channel reaches a target value, the control circuit transmits a signal to a motor driving the conveyer, wherein the motor stops the conveyer upon receipt of the signal from the control circuit.

In various embodiments, the control circuit is configured to analyze a diameter or area of each dark spot, generally corresponding to particle size. The control circuit may send an alert signal if a threshold number or percentage of particles falls outside a target size range.

Since the number of nuclear fuel pellets or particles 2 which enter mold 7 are known, and the mean particle size or the particle size range of nuclear fuel pellets or particles 2 is known, both the number of pellets 2 and a good estimate of the total volume of nuclear fuel material may be determined.

Finally, referring back to FIG. 1, mold 7 may be positioned on a vibratory table 41 which is vibrated by motor 42 during the filling process. The vibrations cause nuclear fuel pellets or particles 2 to be evenly distributed in the matrix material 9. Thus, after filling of mold 7 is completed, a known quantity of nuclear fuel pellets or particles 2 having a known particle size are evenly distributed in a known quantity of matrix material 9. The matrix material 9 in the mold is then solidified by sintering and/or compression to produce a nuclear fuel element with a known amount of uranium particles or pellets homogeneously distributed through a known quantity of a matrix material.

In various embodiments, the mold contains a core element which is free of nuclear kernels prior to filling with nuclear fuel particles and matrix material. The nuclear fuel particles and matrix material are added to the mold so as to surround the core element, so that the final fuel element contains a zone which is free of nuclear fuel particles, and a zone containing a homogeneous distribution of nuclear particles within a matrix material. The core element may be cylindrical, spherical, or cuboid. The core element may have a hollow bore therethrough, so that a first zone containing a homogeneous distribution of nuclear particles exists within the hollow bore of the core element, and a second zone containing a homogeneous distribution of nuclear particles surrounds an outer surface of the core element.

Efficient distribution of fuel particles within the matrix is important, as k-infinity increases with:

- decreasing inter-kernel distance; or
- decreasing mean distance between the kernel and the edge of the fuel element.

When fuel kernels are very close together, they behave as a single large kernel. When kernels are close to a fuel element edge, but far from other kernels, k-infinity also increases. Evenly distributed kernels of roughly similar size produce a more easily controllable nuclear chain reaction with a reduced k-infinity.

Prior art procedures fill a mold for a nuclear fuel element with a known mass of uranium particles, rather than a known number of particles having a known particle size. Such systems may include a small number of large particles, which contribute disproportionately to the total mass, and a large number of small particles. Even when vibrating the mold during filling, such systems may produce a non-homogeneous distribution of uranium particles or pellets within the matrix material, due to the non-homogeneous particle size distribution.

Additionally, the method disclosed herein counts nuclear fuel kernels or coated nuclear fuel particles having a narrow kernel size distribution. Counting such particles produces an accurate total mass of fissionable material. Merely weighing particles, as in the prior art, is less accurate than counting particles because the particle size distribution may not be sufficiently controlled. Additionally, in the case of coated particles, weighing the mass of the coated particles to determine a target amount of fissionable material is inaccurate because of the uncertainty in kernel mass and the uncertainty in coating mass in each particle. TRISO particles and other coated particle fuels have considerable non-fissionable mass. Even if the total mass of a particle is known, the combined uncertainty in kernel mass and coating mass may leave substantial uncertainty in the kernel mass for each coated fuel particle.

In various embodiments disclosed herein, the average fissionable mass per kernel and the particle size per kernel are each known before any non-fissionable mass, e.g., coating layers, is added. The distribution of kernel size and/or kernel mass is very narrow, e.g., ±10%, so that the average value of kernel mass is very representative. In various embodiments, the number of fuel particles in each fuel element is determined by dividing a target fissionable mass per fuel element by the known fissionable mass per particle. This produces a total result which is more accurate than simply measuring the total mass of fuel particles. Since the mass of fissionable material per kernel is precisely known, a wider range of coated fuel particle sizes can be accepted while maintaining a high accuracy and precision on the fissionable mass loading of the fuel element.

When measuring coated particles by total mass, the number of kernels and the mass of fissionable material per kernel are not precisely known, and a narrower range of particle sizes can be accepted. For example, larger particles may be rejected on the grounds that they may have oversize kernels; some of these particles may simply have thicker coatings.

The particulate matrix material 9 is fed into mold 7 from hopper 10 until the mold is filled. Since the total volume of nuclear fuel material in the mold is known, the volume of matrix material in mold 7 is also known. This allows a determination of a ratio of the volume of nuclear fuel material to the volume of matrix material.

Figure 2A:
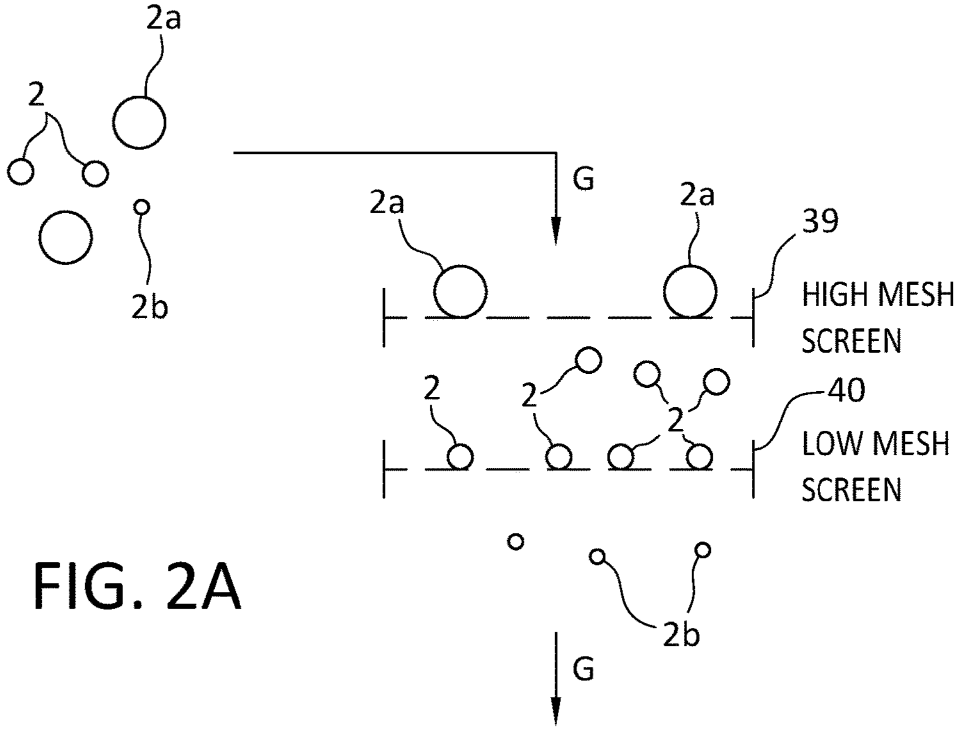
FIG. 2A illustrates a method of sorting nuclear fuel particles by size using screens.

In various embodiments, nuclear fuel pellets or particles 2 should have a substantially uniform size. In the case of a TRISO particle, the mean kernel size is about 200 to 800 microns, 300 to 700 microns, or 350 to 500 microns in diameter, and the mean multilayer coated TRISO particle size is about 500 to 1500 microns, 600 to 1200 microns, or 800 to 1000 microns in diameter. If a set of particles is determined to have an unacceptably wide particle size range, e.g., unacceptably large particles 2*a* or unacceptably small particles 2*b* as shown in FIG. 2A, the particles may be processed to remove particles falling outside an optimum size range. As shown in FIG. 2A, the particle size range may be narrowed by screening. The nuclear fuel pellets or particles may pass through a high mesh screen 39 which retains large particles 2*a*, and then through a low mesh screen 40 which retains particles 2 having a desired size, while passing small particles 2*b*. This allows estimation of the mean size of the uranium kernels. As discussed above, the optical counter in the apparatus of FIG. 1 allows direct measurement of the number of particles added to a mold 7.

Figure 2B:
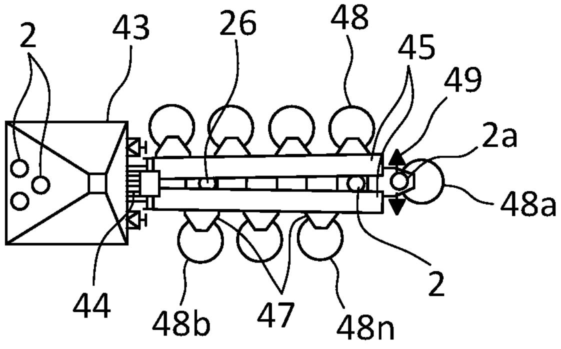
FIG. 2B illustrates a method of sorting nuclear fuel particles by size using roller sorting.

In various embodiments, the particle size range may be narrowed with a roller sorter, as shown in FIG. 2B. Nuclear fuel pellets or particles 2 are fed into hopper 43, and are then fed onto chute 44 and directed onto a pair of sorting rolls 45 with divergent axes and a gap therebetween. At the beginning of the sorting rolls 45, small particles 2*b* fall through the gap, while larger particles 2 and 2*a* are retained by the sorting rolls. The small particles 2*b* may be carried by a first classification chute 47 to a first container 48*b*. At the end of the sorting rolls, the largest particles 2*a* are carried by chute 49 to a container 48*a* for oversize particles. Particles 2 with a target diameter fall through the gap at a point where the width of the gap corresponds to the target diameter, and are fed through a classification chute 47 to a container 48 for receiving particles having the target diameter. One or more containers 48*n* may be positioned at a different point along rollers 45, and be configured to receive particles having a different target diameter from a different classification chute 47. Particles having intermediate sizes fall through the gap at an intermediate position along the sorting rolls, and are each carried by an appropriate classification chute to an appropriate container. This allows collection of particles having a very narrow size range.

In various embodiments, the nuclear fuel kernels are sorted by roller sorting or screen sorting to produce kernels having a narrow size distribution. As a result, the mass of nuclear material in each particle is known. The kernels may then be coated with ceramic layers, carbon layers, or a mixture thereof. While coating may introduce some variation in total particle size, each particle has substantially the same kernel size. If desired, after coating the kernels, the coated particles may be sorted by screen sorting or roller sorting to produce particles having a narrow size distribution, providing nuclear fuel particles with:

- substantially constant kernel sizes; and
- substantially constant total coating thicknesses.

This allows production of substantially homogeneous nuclear fuel particles.

If a mean diameter of a spherical uranium oxide kernel is known to be ~500 microns, then the volume of uranium oxide in each kernel is ~0.52 $mm^3$. Based on an accurate count of the number of nuclear fuel pellets or particles 2, one knows the volume of uranium oxide in a mold 7 for a nuclear fuel element. Additionally, if the volume of uranium oxide, or of the volume of coated uranium oxide particles, e.g., the volume of TRISO particles, in the mold is known, then the amount of particulate matrix material 9 added to the mold 7 can be determined, allowing an accurate determination of the ratio of nuclear material to matrix material. Specifically, the volume of particulate matrix material added to mold 7 may be equal to the amount of void volume remaining in the mold after addition of the nuclear fuel pellets or particles 2 to the mold.

Figure 3:
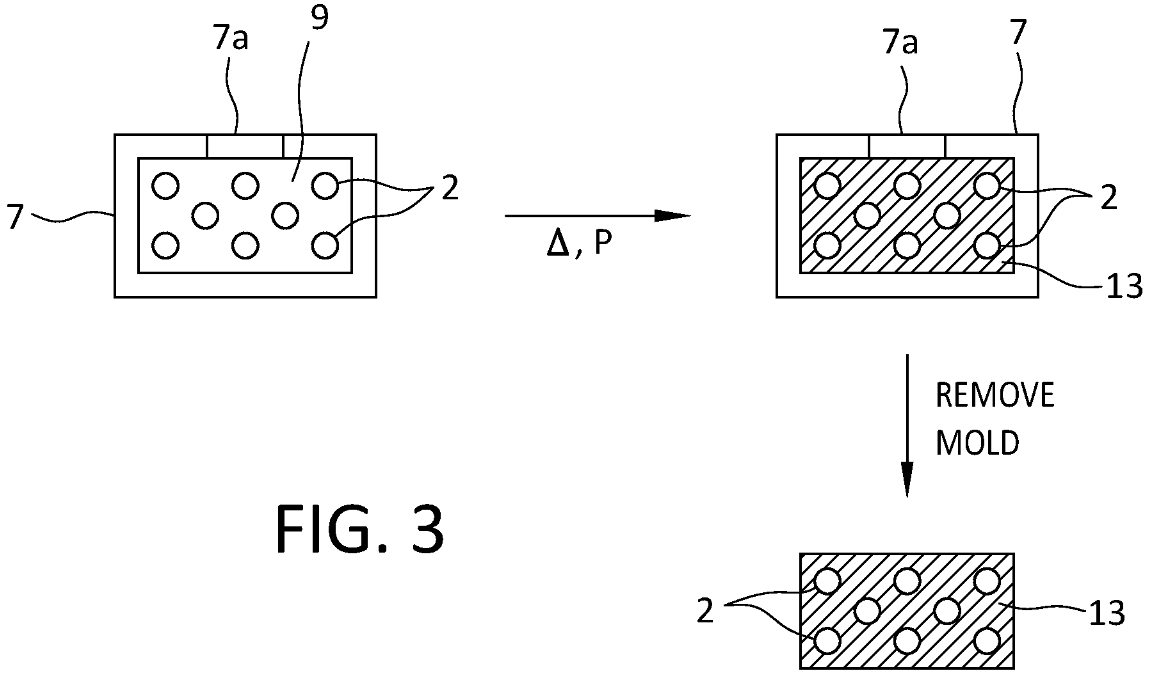
FIG. 3 illustrates preparation of a nuclear fuel element by subjecting a mold containing nuclear fuel particles and a precursor to a solid matrix material to heat and/or pressure.

FIG. 3 shows conversion of a defined number of nuclear fuel pellets or particles 2 and a defined amount of a particulate matrix material 9 into a nuclear fuel element. A mold 7 containing particles 2 and the particulate matrix material 9 is sealed with a closure element 7*a*, and subjected to heat and/or pressure to fuse particulate matrix material 9 into a solid matrix 13, e.g., a solid mass of sintered particles of matrix material 9. The mold 7 and closure element 7*a* are removed to leave a nuclear fuel element containing nuclear fuel pellets or particles 2 and the solid matrix 13. Nuclear fuel pellets or particles 2 may be bare kernels, ceramic-coated kernels, carbon-coated kernels, or kernels coated with carbon and ceramic layers, e.g., TRISO particles. Various materials may be used as an inert matrix material for nuclear fuel, including:

- ceramics, e.g., MgO, $ZrO_2$, or $CeO_2$, or SiC;
- refractory materials, e.g., graphite;
- ceramic-metal composite materials (cermets);
- composite materials formed from two or more ceramics (cercers); and
- metals, e.g., stainless steel, zirconium, molybdenum, or tungsten.

In various embodiments, the particulate matrix material 9 may also contain a minor amount of a burnable poison. Burnable poisons have a high neutron absorption cross section initially, but are converted into materials of relatively low absorption cross section. Due to the burn-up of the poison in a reactor, the negative reactivity of the burnable poison decreases over time. Suitable burnable poisons include of gadolinium, boron, hafnium, or compounds thereof.

Figure 4A:
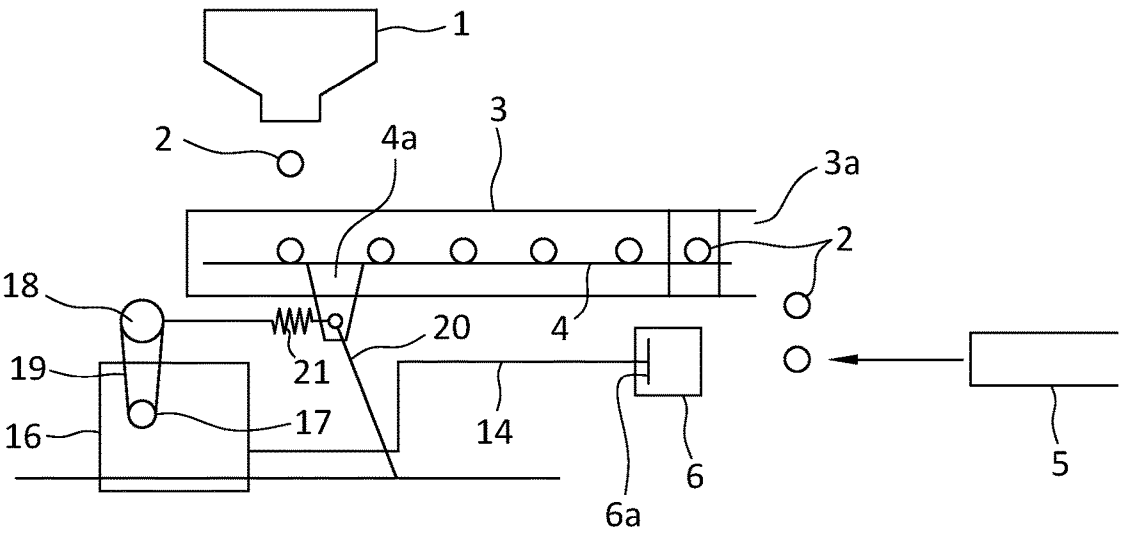
FIGS. 4A and 4B illustrates embodiments of a vibratory conveyer for use in the system of FIG. 1.

FIG. 4A shows an apparatus containing a first embodiment of a vibratory conveyer. A tongue 4*a* on conveyer 4 contains a hole. A cable or rope 20 may have a first end fixed to a solid surface, e.g., a floor, and a second end fixed to an edge of a first wheel 18. The cable or rope 20 pass through the hole in tongue 4*a*, and may have a spring 21 incorporated into cable or rope. Motor 16 rotates a second wheel 17, and a belt 19 is driven by wheel 17 and rotates wheel 18. As wheel 18 rotates, spring 21 undergoes alternating extension and contraction, vibrating conveyer 4 longitudinally.

Figure 4B:
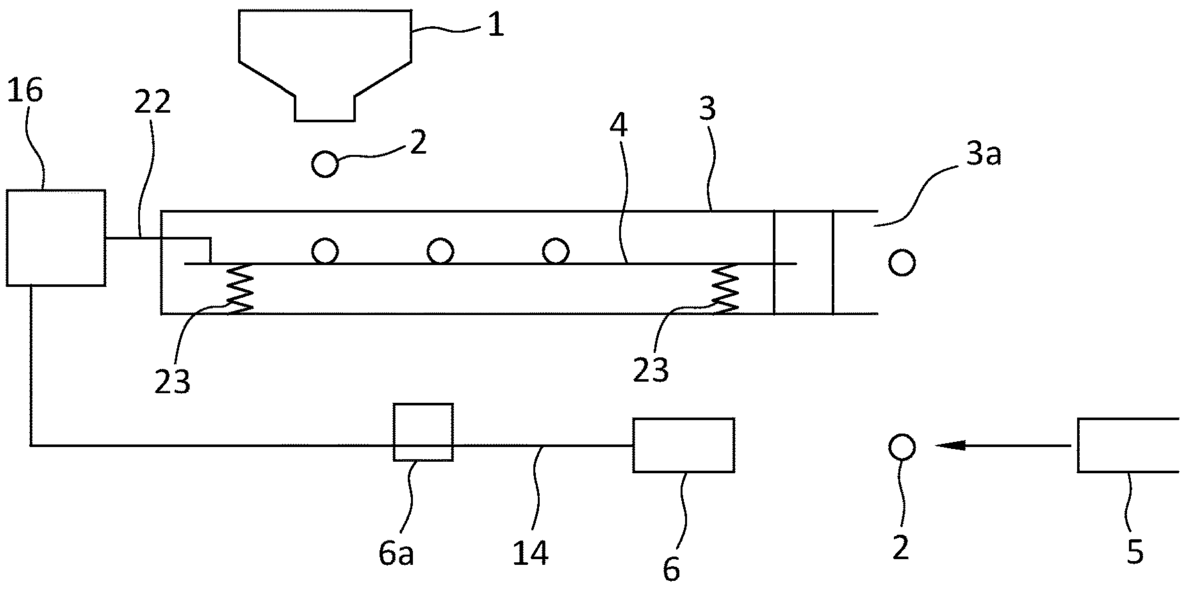

FIG. 4B shows an apparatus containing a secondary embodiment of a vibratory conveyer. Conveyer 4 is mounted on springs 23. Motor 16 is connected to an actuator 22, which transmits vibratory motion from motor 16 to conveyer 4. Springs 23 allow conveyer 4 to vibrate upwards and downwards.

Figure 5A:
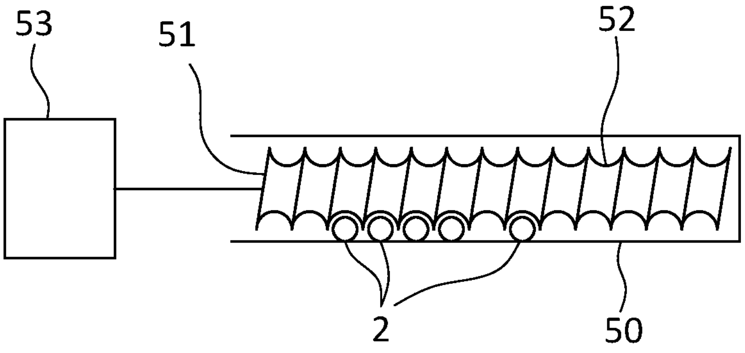
FIGS. 5A and 5B illustrates alternative embodiments of a conveyer for use in the system of FIG. 1.

In various embodiments, the system of FIG. 1 may be modified by replacing the vibratory conveyer with a rotating auger. The channel may have a tubular or semicylindrical conveyer surface 50 running along the length of the channel to the exit, with a threaded auger 51 therein, as shown in FIG. 5A. Driving the conveyer may involve rotating the threaded auger 51 to drive particles 2 within a helical thread 52 of the auger 51 along the conveyer surface 50 to the exit. A motor 53 is configured to rotate the threaded auger 51.

Figure 5B:
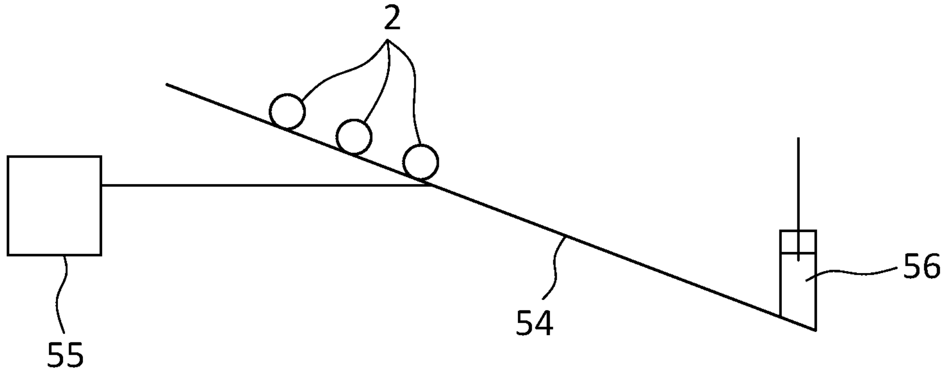

In various embodiments, the system of FIG. 1 may be modified by replacing the vibratory conveyer with a sloped metal conveyer surface. The channel may have sloped metal conveyer surface 54 running along the length of the channel to the exit, as shown in FIG. 5B. The conveyer may be driven by gravity feed, a motor 55 configured to vibrate the conveyer surface, or a combination thereof. If the conveyer is driven by gravity feed, stopping the conveyer may involve closing a gate 56 at the channel exit. If the conveyer is driven by vibration, stopping the conveyer may involve stopping the motor.

Figure 6:
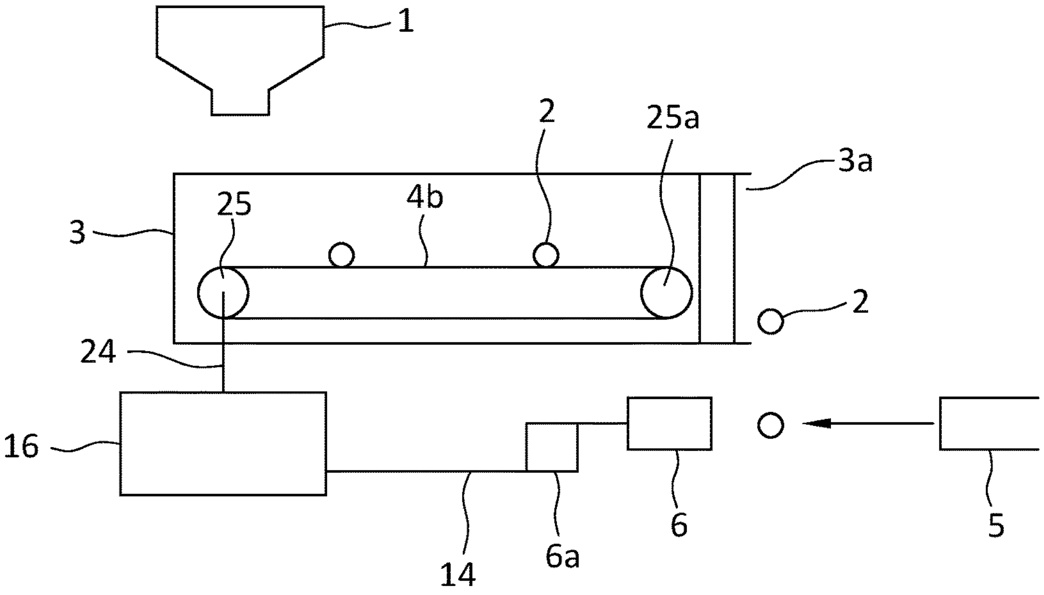
FIG. 6 illustrates an endless belt conveyer for use in the system of FIG. 1.

FIG. 6 shows an apparatus containing an endless belt conveyer. Conveyer 4*b* is a flexible belt carried by rollers 25 and 25*a*. Conveyer 4*b* is driven by motor 16, which contains an actuator 24 which rotates roller 25. Roller 25*a* may be rotated by motion of conveyer 4*b* around roller 25. Alternatively, roller 25*a* may be rotated by a second motor. As rollers 25 and 25*a* carry the flexible belt of conveyer 4*a*, particles 2 are conveyed along channel 3 until they reach exit 3*a*. As particles fall from exit 3*a*, they pass the light source 5 and sensor 6, which transmit a signal to control circuit 6*a* each time a particle passes sensor 6. Once a desired number of particles are detected, control circuit 6*a* transmits a signal to motor 16, causing motor 16 to cease rotation of roller 25 and stopping motion of the endless belt conveyer.

Once the mold 7 is filled with nuclear fuel pellets or particles 2 and a defined amount of a particulate matrix material 9, the contents are subjected to heat and or pressure to convert the particulate matrix material 9 into a solid matrix material 13, as shown in FIG. 3. This may be done by a number of techniques.

Figure 7:
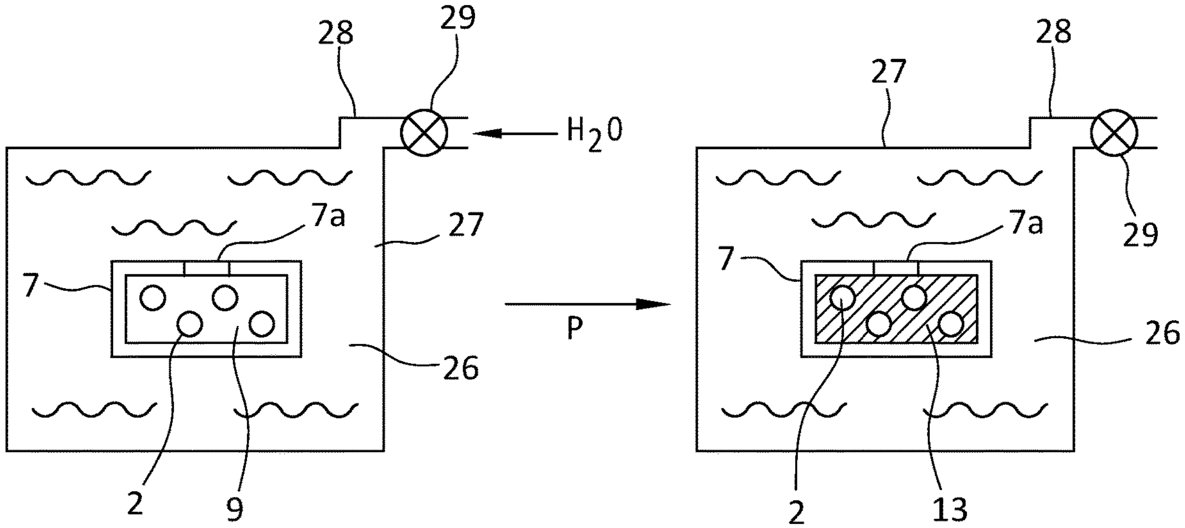
FIG. 7 illustrates preparation of a nuclear fuel element by subjecting a mold containing nuclear fuel particles and a precursor to a solid matrix material to cold isostatic pressing.

FIG. 7 shows preparation of a nuclear fuel element by cold isostatic pressing, where FIG. 7 shows the wet bag procedure. Mold 7 containing nuclear fuel pellets or particles 2 and particulate matrix material 9 is positioned in a vessel 27. The mold 7 may be a flexible mold, and may be made of an elastomeric material, e.g., a rubber. A mold opening is closed with closure 7*a*. In some embodiments, mold 7 may be a sacrificial mold, and closure 7*a* may have a smaller diameter than the interior of mold 7. In some embodiments, mold 7 may be a reusable mold, and closure 7*a* may have the same diameter as the interior of mold 7, so as to allow recovery of the nuclear fuel element without damaging the mold.

After mold 7 is positioned in vessel 27, vessel 27 is filled with a liquid material 26, e.g., water, under high pressure through pipe 28. When the desired pressure is reached, valve 29 in pipe 28 is closed, and pressure from the high-pressure liquid 26 is applied to the contents of elastomeric mold 7 until particulate matrix material 9 sinters into a solid mass of matrix material 13. In some embodiments, the liquid material 26 may be heated, to allow application of both heat and pressure to mold 7. Use of a pressurized heated liquid may enhance the sintering process. Dry bag isostatic pressing procedures are known in the art, and may be used to form a nuclear fuel element.

Figure 8:
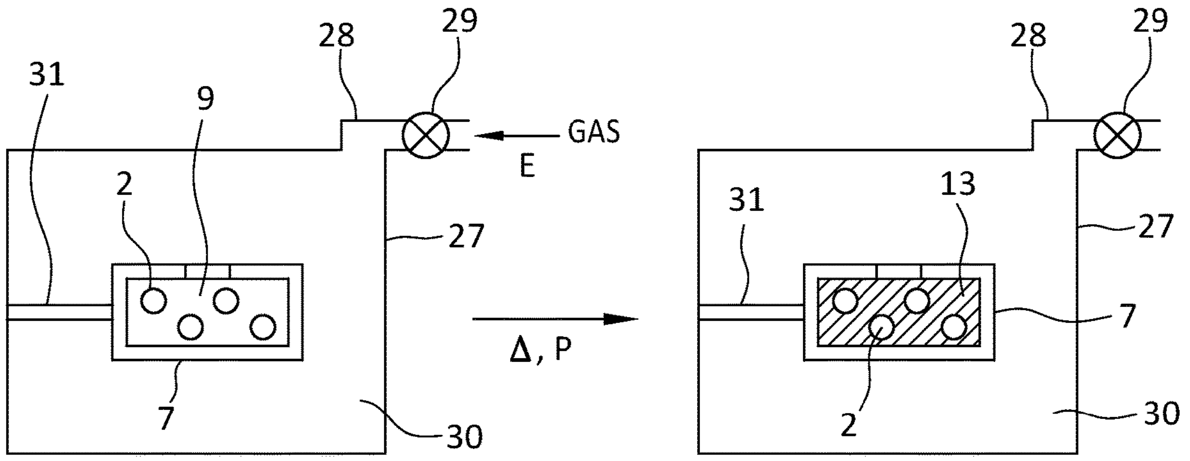
FIG. 8 illustrates preparation of a nuclear fuel element by subjecting a mold containing nuclear fuel particles and a precursor to a solid matrix material to hot isostatic pressing.

FIG. 8 shows preparation of a nuclear fuel element by hot isostatic pressing. A flexible elastomeric mold 7 containing nuclear fuel pellets or particles 2 and particulate matrix material 9 is positioned in a vessel 27. A mold opening is closed with closure 7*a*. In some embodiments, mold 7 may be a sacrificial mold, and closure 7*a* may have a smaller diameter than the interior of mold 7. In some embodiments, mold 7 may be a reusable mold, and closure 7*a* may have the same diameter as the interior of mold 7, so as to allow recovery of the nuclear fuel element without damaging the mold.

After mold 7 is positioned in vessel 27, vessel 27 is filled with a gas 30, e.g., air, nitrogen, argon, or any other nonreactive gas, under high pressure through pipe 28. When the desired pressure is reached, valve 29 in pipe 28 is closed, and pressure from the pressurized gas 39 is applied to the contents of elastomeric mold 7. Also, gas 30 is heated to a sintering temperature. The hot pressurized gas 7 applies both heat and pressure to mold 7 until particulate matrix material 9 sinters into a solid mass of matrix material 13.

Figure 9:
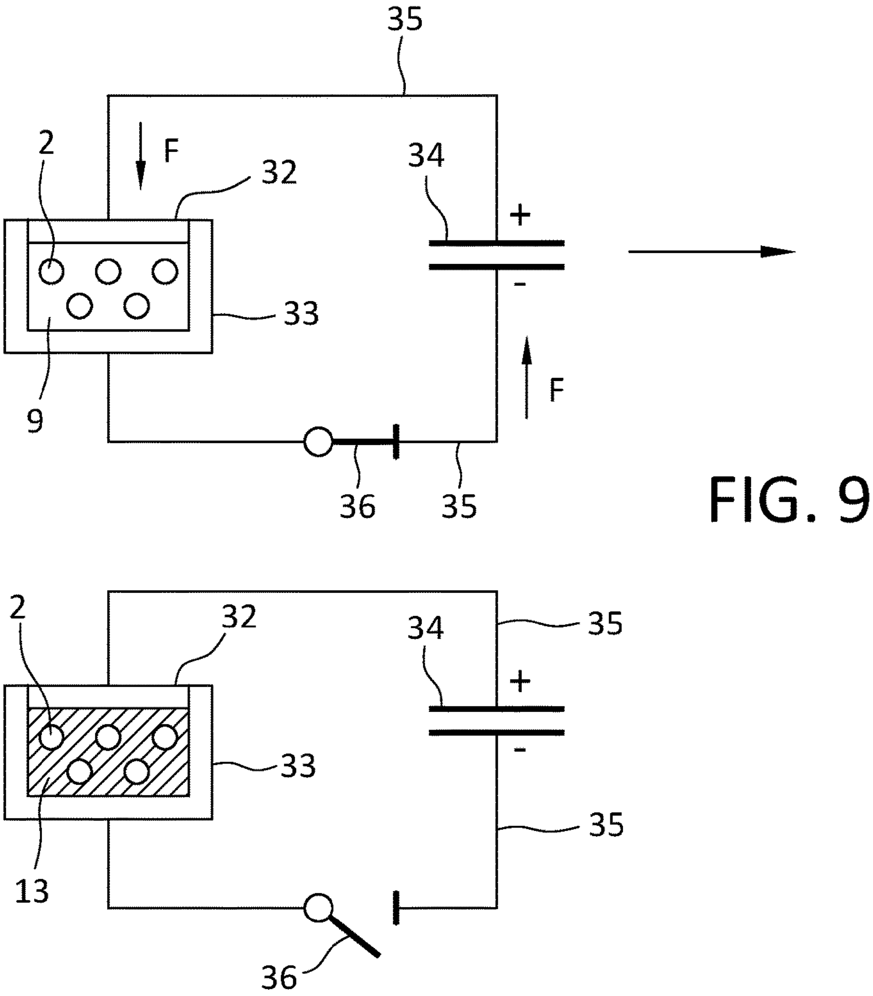
FIG. 9 illustrates preparation of a nuclear fuel element by subjecting a mold containing nuclear fuel particles and a precursor to a solid matrix material to spark plasma sintering.

FIG. 9 shows preparation of a nuclear fuel element by spark plasma sintering. A mold 33 with a hollow body is filled with nuclear fuel pellets or particles 2 and particulate matrix material 9. A lid 32 is placed on the mold 7, and pressed against the mold contents. Mold 33 and lid 32 are made of a resistive material, e.g., graphite. An electrical circuit 35 is connected across mold 33 and lid 32. A power source 34 and a switch 36 may be included in circuit 35. When switch 36 is closed, electrical current flows in the direction of arrows F through the mold 33 and lid 32. The mold 33 and lid 32 are resistively heated, heating matrix material 9 and sintering it into a solid matrix material 13. After the sintering step is completed, switch 36 may be opened, ceasing current flow through the mold. Once the mold and its contents have cooled, lid 32 may be removed from mold 33, and a completed fuel element comprising nuclear fuel particles 2 in a sintered solid matrix 13 may be removed from the mold.

Figure 10:
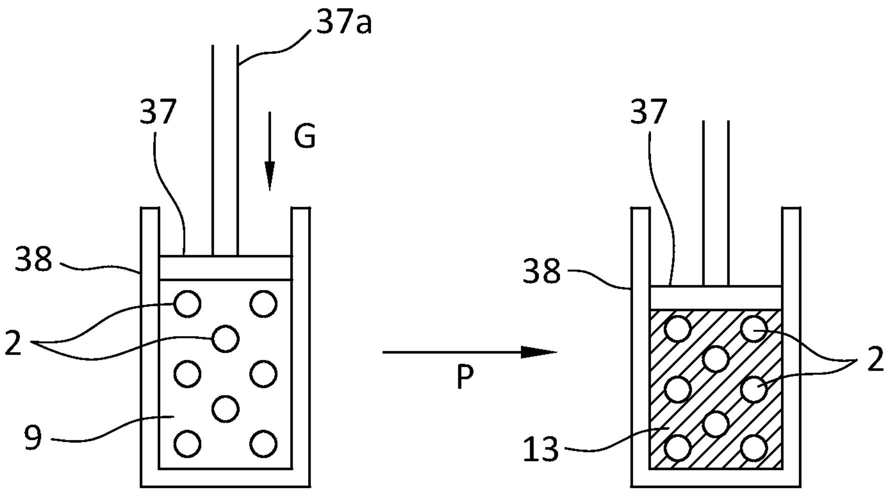
FIG. 10 illustrates preparation of a nuclear fuel element by subjecting a mold containing nuclear fuel particles and a precursor to a solid matrix material to uniaxial pressing.

FIG. 10 shows preparation of a nuclear fuel element by uniaxial pressing. A mold 38 with a hollow body is filled with nuclear fuel pellets or particles 2 and particulate matrix material 9. A lid 37 is placed on the mold 7, and pressed against the mold contents in the direction of arrow G by a piston or other device 37*a*. This applies pressure to particles 2 and particulate matrix material 9, compressing them until particulate matrix material 9 is converted into a solid matrix material 13. In various embodiments, the mold may be heated to assist in solidifying or sintering particulate matrix material 9. While FIG. 10 shows pressing from a single direction, the contents of the mold may be compressed by pistons driven in opposing directions.

In the processes of forming a nuclear fuel element by hot or cold isostatic pressing, spark plasma sintering, and uniaxial pressing, the mold may be any desired shape, including spherical, cylindrical, or cuboid.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for producing a nuclear fuel element having a target number of nuclear fuel kernels, comprising:
- a channel having an exit, the channel being configured to receive the nuclear fuel kernels, wherein the nuclear fuel kernels have a mean kernel size of 200 to 800 microns;
- a conveyer configured to transmit the nuclear fuel kernels along the channel to the exit;
- an optical counter configured to count a number of the nuclear fuel kernels which pass through the exit of the channel,
- a control circuit configured to transmit a signal when the target number of the nuclear fuel kernels exits the channel,
- a motor configured to:
  - drive the conveyer to cause the conveyer to move the kernels along the channel toward the exit until the target number of the nuclear fuel kernels exits the channel through the exit;
  - receive the signal from the control circuit; and
  - stop the conveyer after receiving the signal from the control circuit;
- a vibrating mold; and
- a passage configured to convey the target number of the nuclear fuel kernels from the exit of the channel to the vibrating mold.

2. The system of claim 1, wherein:
- the vibrating mold is configured to:
  - receive the target number of the nuclear fuel kernels from the passage;
  - receive a particulate matrix material; and
  - homogeneously distribute the target number of the nuclear fuel kernels within the particulate matrix material.

3. The system of claim 1, wherein:
- the conveyer is a vibratory conveyer having a conveyer surface running along the length of the channel to the exit, and
- the motor is configured to vibrate the conveyer surface.

4. The system of claim 1, wherein:

the conveyer is a conveyer having at least two rollers and an endless belt carried by the at least two rollers, the endless belt running along the length of the channel to the exit; and the motor is configured to rotate the at least two rollers.

5. The system of claim 1, wherein:

the signal transmitted by the control circuit is a first signal; and the optical counter comprises:

a camera positioned at the exit of the channel, wherein the camera is configured to transmit a second signal each time one of the nuclear fuel kernels exits the channel; and a control circuit, wherein the control circuit is configured to:

receive the second signal from the camera each time one of the nuclear fuel kernels exits the channel;

determine the number of the nuclear fuel kernels which exit the channel; and transmit the first signal to the motor when the target number of the nuclear fuel kernels exits the channel.

6. The system of claim 1, wherein the vibrating mold is a metal mold, a graphite mold, or a rubber mold.

7. The system of claim 1, wherein the nuclear fuel kernels have a ceramic coating, a carbon coating, or a combination thereof.

8. A system for producing a nuclear fuel element having a target number of nuclear fuel kernels, comprising:

a channel having an exit, the channel being configured to receive nuclear fuel kernels, wherein the nuclear fuel kernels have a mean kernel size of 200 to 800 microns;

a conveyer configured to transmit the nuclear fuel kernels along the channel to the exit;

an optical counter configured to count a number of the nuclear fuel kernels which pass through the exit of the channel, and a motor configured to:

drive the conveyer to cause the conveyer to move the kernels along the channel toward the exit until a target number of the nuclear fuel kernels exits the channel through the exit, and stop the conveyer after receiving a first signal from the optical counter;

wherein the optical counter comprises:

a laser positioned at the exit of the channel, wherein the laser is configured to transmit a beam, wherein the beam is interrupted each time one of the nuclear fuel kernels exits the channel;

a sensor configured to receive the beam from the laser, wherein the sensor is configured to transmit a second signal each time the beam is interrupted; and a control circuit, wherein the control circuit is configured to:

receive the second signal from the sensor each time the beam is interrupted, and count the nuclear fuel kernels which exit the channel; and transmit the first signal to the motor when the target number of the nuclear fuel kernels exits the channel;

wherein the system further comprises a vibrating mold;

wherein the vibrating mold is configured to:

receive the target number of the nuclear fuel kernels from the exit of the channel;

receive a particulate matrix material; and homogeneously distribute the target number of the nuclear fuel kernels within the particulate matrix material.

9. The system of claim 8, wherein the nuclear fuel kernels have a ceramic coating, a carbon coating, or a combination thereof.

10. A method for producing a nuclear fuel element having a target number of nuclear fuel using kernels, wherein the method uses a system comprising:

a channel having an exit, the channel being configured to receive nuclear fuel kernels;

a conveyer configured to transmit the nuclear fuel kernels along the channel to the exit;

an optical counter configured to count a number of the nuclear fuel kernels which pass through the exit of the channel, and a motor configured to:

drive the conveyer until a target number of the nuclear fuel kernels exits the channel through the exit, and stop the conveyer after receiving a first signal from the optical counter;

wherein the optical counter comprises:

a laser positioned at the exit of the channel, wherein the laser is configured to transmit a beam, wherein the beam is interrupted each time one of the nuclear fuel kernels exits the channel;

a sensor configured to receive the beam from the laser, wherein the sensor is configured to transmit a second signal each time the beam is interrupted; and a control circuit, wherein the control circuit is configured to:

receive the second signal from the sensor each time the beam is interrupted, and count the nuclear fuel kernels which exit the channel; and transmit the first signal to the motor when the target number of the nuclear fuel kernels exits the channel;

wherein the method comprises:

feeding nuclear fuel kernels along the channel having the exit;

driving the conveyer with the motor to transmit the nuclear fuel kernels along the channel to the exit;

using the optical counter to count a number of the nuclear fuel kernels which pass through the exit of the channel;

stopping the conveyer upon receipt of the first signal, after the target number of the nuclear fuel kernels exits the channel;

feeding the target number of the nuclear fuel kernels into a mold for shaping the nuclear fuel element;

filling the mold containing the target number of the nuclear fuel kernels with a particulate matrix material so as to homogeneously distribute the target number of the nuclear fuel kernels within the particulate matrix material; and converting the particulate matrix material into a solid matrix material with the nuclear fuel kernels distributed therein;

wherein a volume of nuclear material in the solid matrix material is known.

11. The method of claim 10, wherein the nuclear fuel kernels have a ceramic coating, a carbon coating, or a combination thereof.

* * * * *